United States Patent
Wu et al.

(10) Patent No.: US 12,298,601 B2
(45) Date of Patent: May 13, 2025

(54) MYOPIA MANAGEMENT SOFT CONTACT LENS DESIGN DERIVE FROM ANALYSIS OF OVERNIGHT ORTHOKERATOLOGY PROCEDURE

(71) Applicants: Richard I Tsung Wu, Taipei (TW); BRIGHTEN OPTIX CORP., Taipei (TW)

(72) Inventors: Richard I Tsung Wu, Taipei (TW); Wen-Pin Lin, Taipei (TW); Lo-Yu Wu, Taipei (TW)

(73) Assignee: BRIGHTEN OPTIX CORP., Taipei (TW)

( * ) Notice: Subject to any disclaimer, the term of this patent is extended or adjusted under 35 U.S.C. 154(b) by 643 days.

(21) Appl. No.: 17/590,398

(22) Filed: Feb. 1, 2022

(65) Prior Publication Data
US 2023/0244089 A1    Aug. 3, 2023

(51) Int. Cl.
*G02C 7/02* (2006.01)
*G02C 7/04* (2006.01)

(52) U.S. Cl.
CPC .............. *G02C 7/028* (2013.01); *G02C 7/047* (2013.01); *G02C 2202/24* (2013.01)

(58) Field of Classification Search
CPC ..... G02C 7/028; G02C 7/047; G02C 2202/24; G02C 7/027; G02C 7/04
See application file for complete search history.

(56) References Cited

U.S. PATENT DOCUMENTS

2018/0275425 A1*    9/2018  Collins ................. G02C 7/027

* cited by examiner

*Primary Examiner* — Tuyen Tra
(74) *Attorney, Agent, or Firm* — MUNCY, GEISSLER, OLDS & LOWE, P.C.

(57) ABSTRACT

A myopia management soft contact lens design derive from analysis of overnight orthokeratology procedure that is to obtain the corneal height data before and after treatment according to reference position of cornea before and after treatment by mathematical calculation and then superimpose data with reference position of cornea, and then obtain corresponding central optical zone size and peripheral treatment zone size by obtaining the difference between corneal changes before and after treatment using corneal height data and tangential curvature data, and then calculate power change data before and after corneal treatment by using position of central optical zone and peripheral treatment zone to match the axial curvature data, the algorithm, and then use the power change data to distinguish different myopia power correction ranges to analyze the corresponding different power profile, and then apply this power profile to front curved surface of lens for the manufacture of soft contact lenses.

8 Claims, 10 Drawing Sheets

MYOPIA MANAGEMENT SOFT CONTACT LENS DESIGN DERIVE FROM ANALYSIS OF OVERNIGHT ORTHOKERATOLOGY PROCEDURE

BACKGROUND OF THE INVENTION

1. Field of the Invention

The present invention relates to a myopia management soft contact lens design derive from analysis of overnight orthokeratology procedure, especially it refers to the method for designing contact lenses with corneal refractive power changes before and after corneal treatment, which can be used for the purpose of refractive errors correction.

2. Description of the Related Art

The development of innovative Computers/Communications/Consumers products have made life easier and more convenient. Especially the creation of a large number of 3C products results in the popularity of communication and Internet applications. However, many people immerse themselves in the use of 3C electronic products. Mobile phone overuse is seen among certain office workers, students, middle aged and elderly people. People everywhere are beginning to lose patience with the phenomenon known as phubbing: snubbing others in a social setting by checking your phone. Mobile phone overuse can also lead to visual impairment, injury, and increase in myopia prevalence.

Moreover, the reason why people have Myopia, also known as short-sightedness, is caused by the mismatch between the refractive error and the axial length. It may be that the axial length is too long, or the corneal curvature is too steep. When the refractive power of the eye is too powerful, it will cause the light from the distant objects to focus in front of the retina, which will cause the visual image to fall in front of the retina, resulting in blurred vision. Therefore, in order to correct myopia, it is necessary to reduce the light-bending ability. Since cornea accounts for about 80% of the entire eye's total focusing power, it is only necessary to reduce the corneal refractive power to achieve the effect of correcting myopia.

At present, the main methods of correcting refractive errors include wearing glasses, wearing contact lenses, corneal myopia surgery or wearing orthokeratology lenses. There are advantages and disadvantages of above different methods, and the orthokeratology lens will be especially described in following paragraphs. The orthokeratology lens is made of high oxygen permeable rigid gas material. When the lens is worn on an eyeball, a non-uniform of tear is sandwiched between the lens and an outer surface of the cornea of the eyeball, and the tear can apply a positive pressure on the cornea to remodel epithelial cells; at the same time, when the wearer closes the eye wearing the orthokeratology lens, the cornea is applied a certain pressure by eyelid and the orthokeratology lens. If the wearing time is sufficient, central curvature of the wearer's cornea can be gradually flattened and central epithelial layer of the wearer's cornea can be gradually thinned, so that the center of the cornea can be flattened and the refractive power of the cornea can be reduced, thereby treating the wearer to correct myopia or even return to normal vision.

Therefore, some companies have developed overnight corneal reshaping contact lenses, which can be worn by users at night during sleep. The eyelid pushes the lens for a long time to cause proper pressure on the cornea, which causes the cornea to flatten and reduce the refractive errors. However, in the daytime, due to stop wearing lens, the corneal curvature returned to baseline, resulting in blurred vision. The corneal reshaping effect is temporary and needs to be improved.

SUMMARY OF THE INVENTION

The present invention has been accomplished under the circumstances in view. It is therefore the main object of the present invention to provide a myopia management soft contact lens design derive from analysis of overnight orthokeratology procedure, which is to obtain the corneal height data before and after corneal treatment according to the reference position of the cornea before and after corneal treatment by mathematical calculation and then superimpose the data with the reference position of the cornea, and then obtain the corresponding central optical zone size and peripheral treatment zone size by obtaining the difference between corneal changes before and after corneal treatment using corneal height data and tangential curvature data, and then calculate the curvature change data before and after corneal treatment by using the position of the central optical zone and peripheral treatment zone to match the axial curvature data, and then use the curvature change data to distinguish different ranges of myopia treatment to analyze the corresponding different power profile, and then apply this power profile to the front curved surface of the lens for the soft contact lenses manufacturing. It can achieve the goal of completing the design of contact lenses and making the lens structure of soft contact lenses. Thus, wearing soft contact lenses continuously can correct the refractive error and effectively reduce the power of myopia.

It is another object of the present invention to provide a myopia management soft contact lens design derive from analysis of overnight orthokeratology procedure, wherein the reference position of the cornea before and after treatment is used to obtain the corneal height data before and after treatment using a mathematical calculation method that is 3D Rotation Matrix algorithm or Iterative Closest Point algorithm. The corneal height data before and after corneal treatment are superimposed according to the reference position. The 3D Rotation Matrix algorithm is $$R_x = \begin{bmatrix} 0 & 0 & 0 \\ 0 & \cos\alpha & -\sin\alpha \\ 0 & \sin\alpha & \cos\alpha \end{bmatrix}, R_y = \begin{bmatrix} \cos\beta & 0 & \sin\beta \\ 0 & 1 & 0 \\ -\sin\beta & 0 & \cos\beta \end{bmatrix}, R_z = \begin{bmatrix} \cos\gamma & -\sin\gamma & 0 \\ \sin\gamma & \cos\gamma & 0 \\ 0 & 0 & 1 \end{bmatrix},$$

$$\alpha = -\frac{\pi}{2} + \cos^{-1}[(N_x, N_y, N_z) \cdot (0, 1, 0)]°,$$

$$\beta = -\frac{\pi}{2} + \cos^{-1}[(N_x, N_y, N_z) \cdot (0, 0, 1)]° \text{ and } \gamma = 0°,$$

use Zernike fitting to find the optical region vector and calculate the angle difference between the highest point position on the reference axis and the highest point of measurement in the 3D space. The Iterative Closest Point algorithm is (TR*MP+TT)=D, where the TR is the rotation matrix that minimizes the distance; TT is translation vector; MP is move plane for overlap (after treatment data); and D (Datum is Baseline equal to before treatment data).

It is still another object of the present invention to provide a myopia management soft contact lens design derive from analysis of overnight orthokeratology procedure, wherein between the Corneal height data and Tangential curvature data, the corneal height data is converted into tangential curvature data, which is performed according to the following formula:

$$K(\text{Tangential curvature}) = \frac{|D_2|}{\sqrt{[1+(D_1)^2]^3}},$$

$$D_0 = \frac{Z_1 - Z_0}{R_1 - R_0}, D_1 = \frac{Z_2 - Z_1}{R_2 - R_1}, D_2 = \frac{D_1 - D_0}{R_2 - R_1},$$

where the $Z_0$: the height of the starting point; the $Z_1$: the height of the cornea at the first point; the $Z_2$: the height of the cornea at the second point; the $R_0$: the radius of the starting point; the $R_1$: the radius of the first point; the $R_2$: the radius of the second point. The difference in the corneal height change before and after corneal treatment is that the height data of the cornea after the treatment is used to obtain the position of the corresponding complex point (x) formed in the central optical zone and the position of the complex point (y) formed in the peripheral treatment zone within 360 degrees, and use the Curve fit calculation method to obtain a better range of the central optical zone and the peripheral treatment zone, and the Curve fit method uses Least-square analysis:

error=$\Sigma[(x-x_c)^2+(y-y_c)^2-R^2]$, the error=0, substitute the complex point (x) of the central optical zone and the complex point (y) of the peripheral treatment zone into the above formula of the Least-square analysis to solve for the $X_C$, $Y_C$, and R value, where ($X_C$, $Y_C$) is the position of the center point of the fitting circle, and the R is the radius value of the fitting circle. Moreover, the central optical zone is the vision correction area, and the peripheral treatment zone is the myopia control area.

It is still another object of the present invention to provide a myopia management soft contact lens design derive from analysis of overnight orthokeratology procedure, wherein the position of the central optical zone and the peripheral treatment zone are calculated using the algorithm to calculate the corresponding power change. The algorithm uses the central optical zone and the peripheral treatment zone to calculate the power distribution and the power difference between the refractive power of the central optical zone and the peripheral treatment zone using Axial curvature data.

It is still another object of the present invention to provide a myopia management soft contact lens design derive from analysis of overnight orthokeratology procedure, wherein after applying the distribution change of Axial curvature data and superimposing the area analyzed by Tangential curvature data, to depict the corresponding Power profile.

It is still another object of the present invention to provide a myopia management soft contact lens design derive from analysis of overnight orthokeratology procedure, which is to obtain the difference in corneal height change before and after corneal treatment, and then use the axial curvature data to calculate the power distribution and the power difference of the central optical zone refractive power and the peripheral treatment zone refractive power of the contact lens, and then combine the tangential curvature data to depict the corresponding power profile, and then complete the contact lens design.

DETAILED DESCRIPTION OF THE PREFERRED EMBODIMENT

Figure 1:
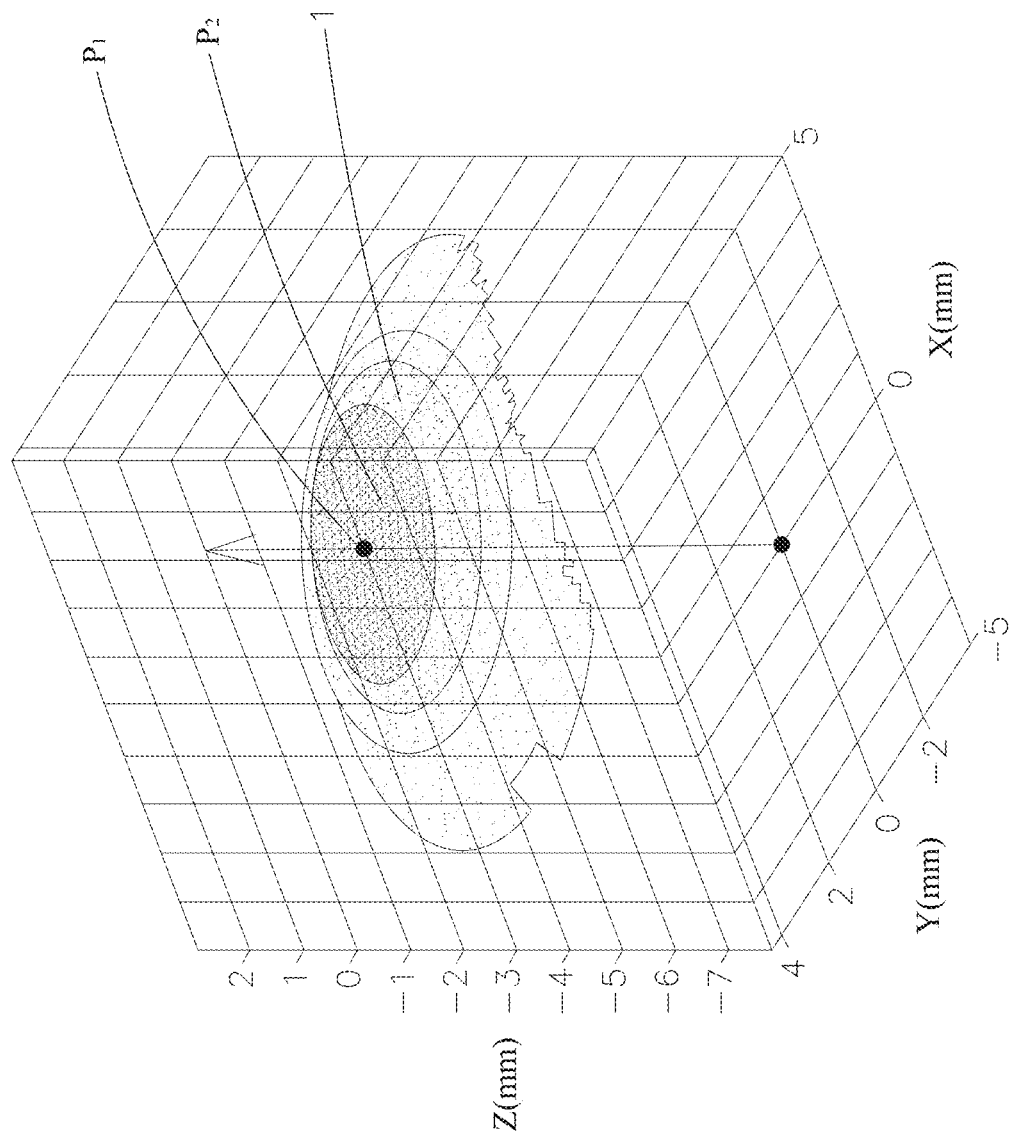
FIG. 1 is a 3D rotation diagram of the center of the visual axis of the present invention.
Figure 4:
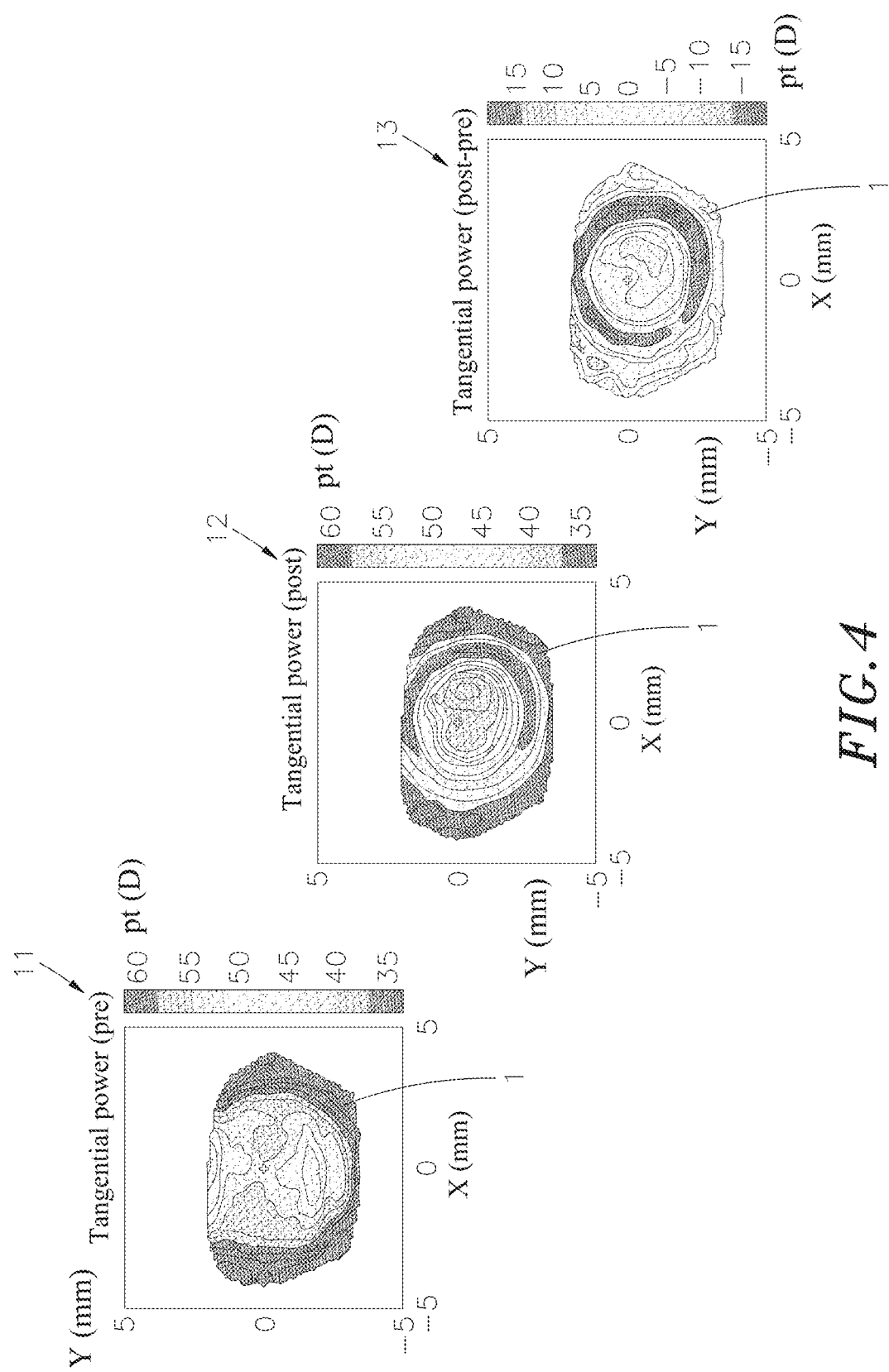
FIG. 4 is a topographic map of the tangential curvature of before and after corneal treatment and after superimposition of the present invention.
Figure 5:
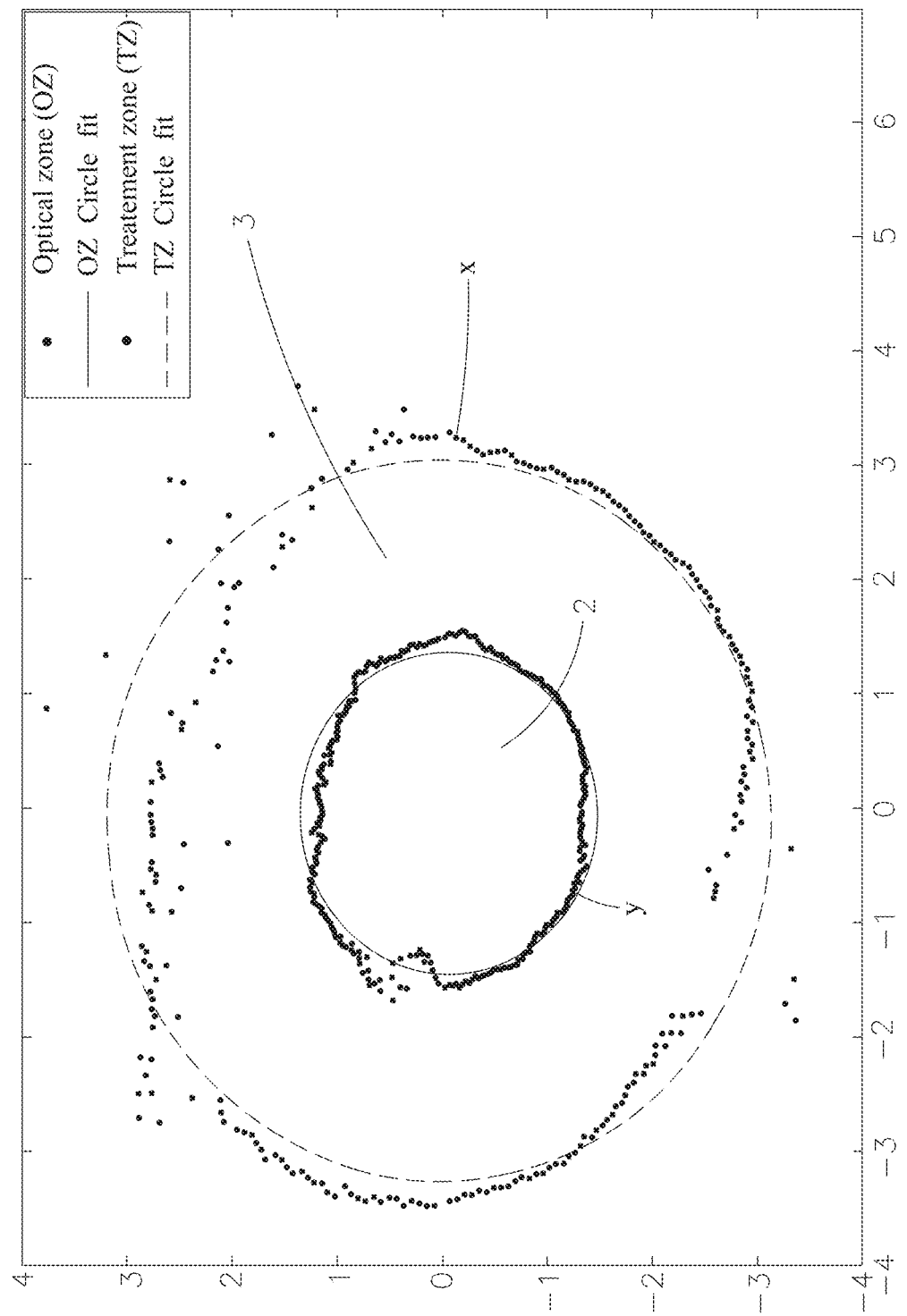
FIG. 5 is a diagram showing the position of the boundary points of the corresponding optical zone and the treatment zone on the cornea of the present invention.
Figure 6:
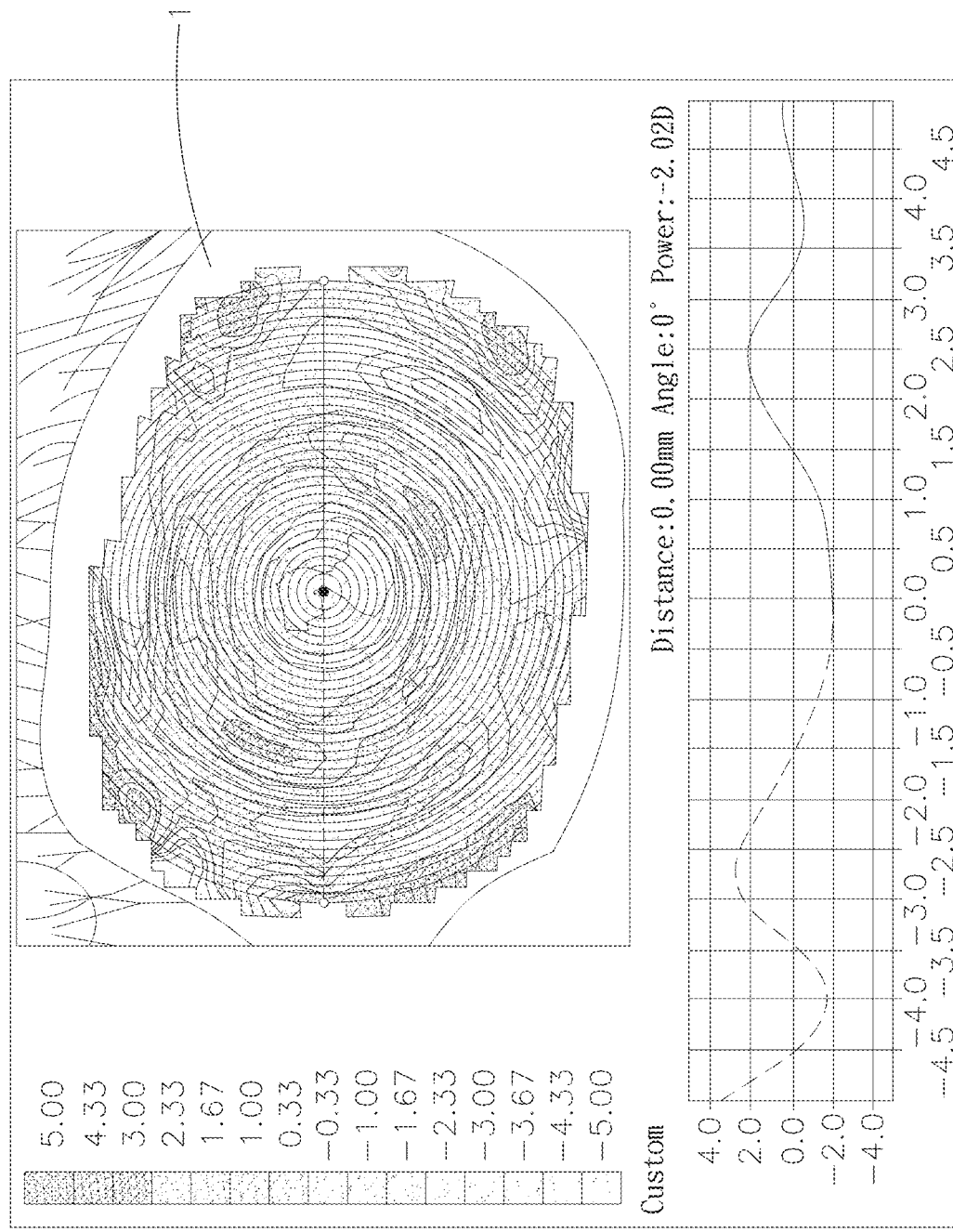
FIG. 6 is a schematic diagram of the drawing mode of before and after corneal treatment of the present invention.
Figure 7:
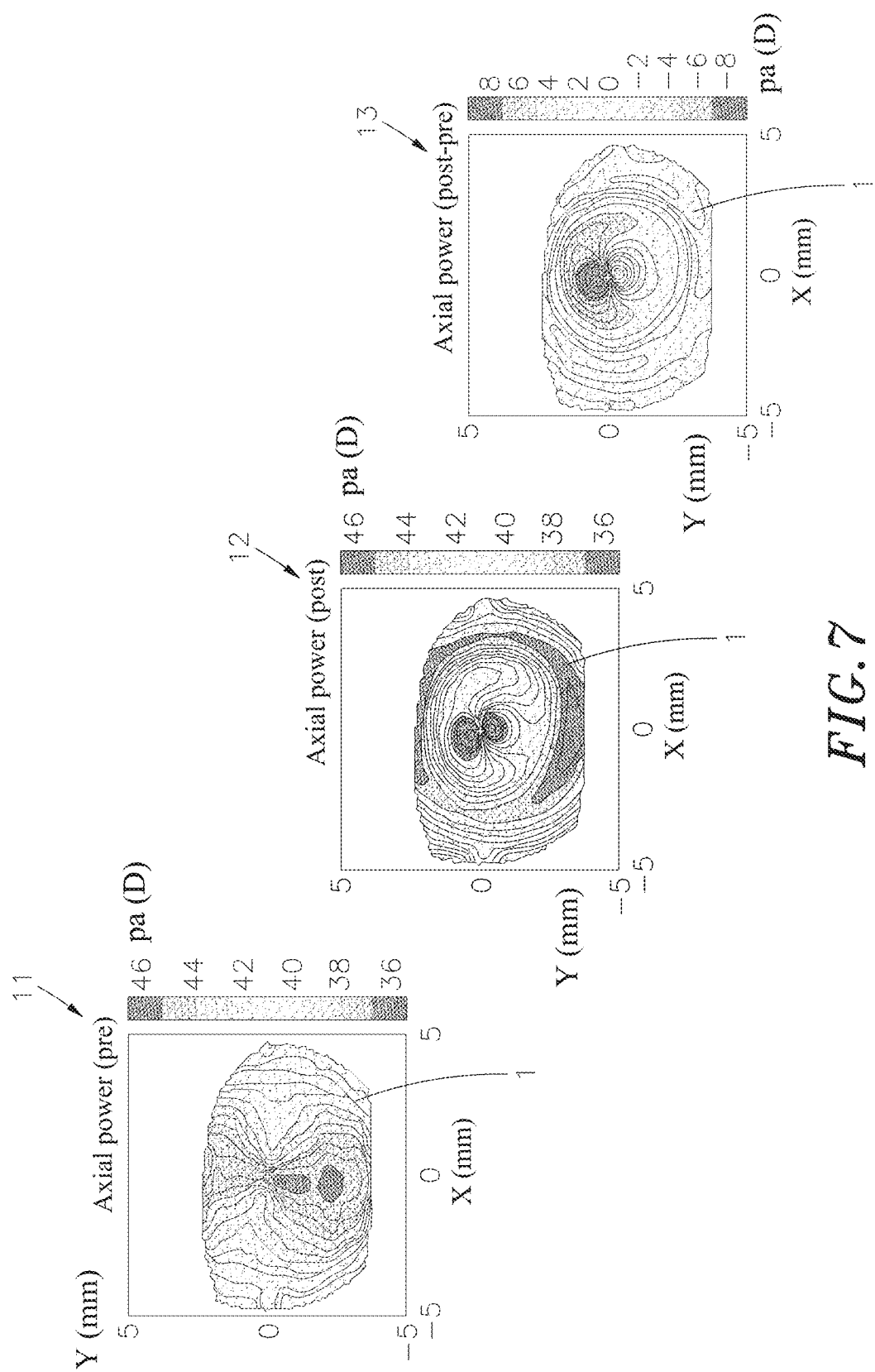
FIG. 7 is a topographic map of the axial curvature of before and after corneal treatment and after superimposition of the present invention.
Figure 8:
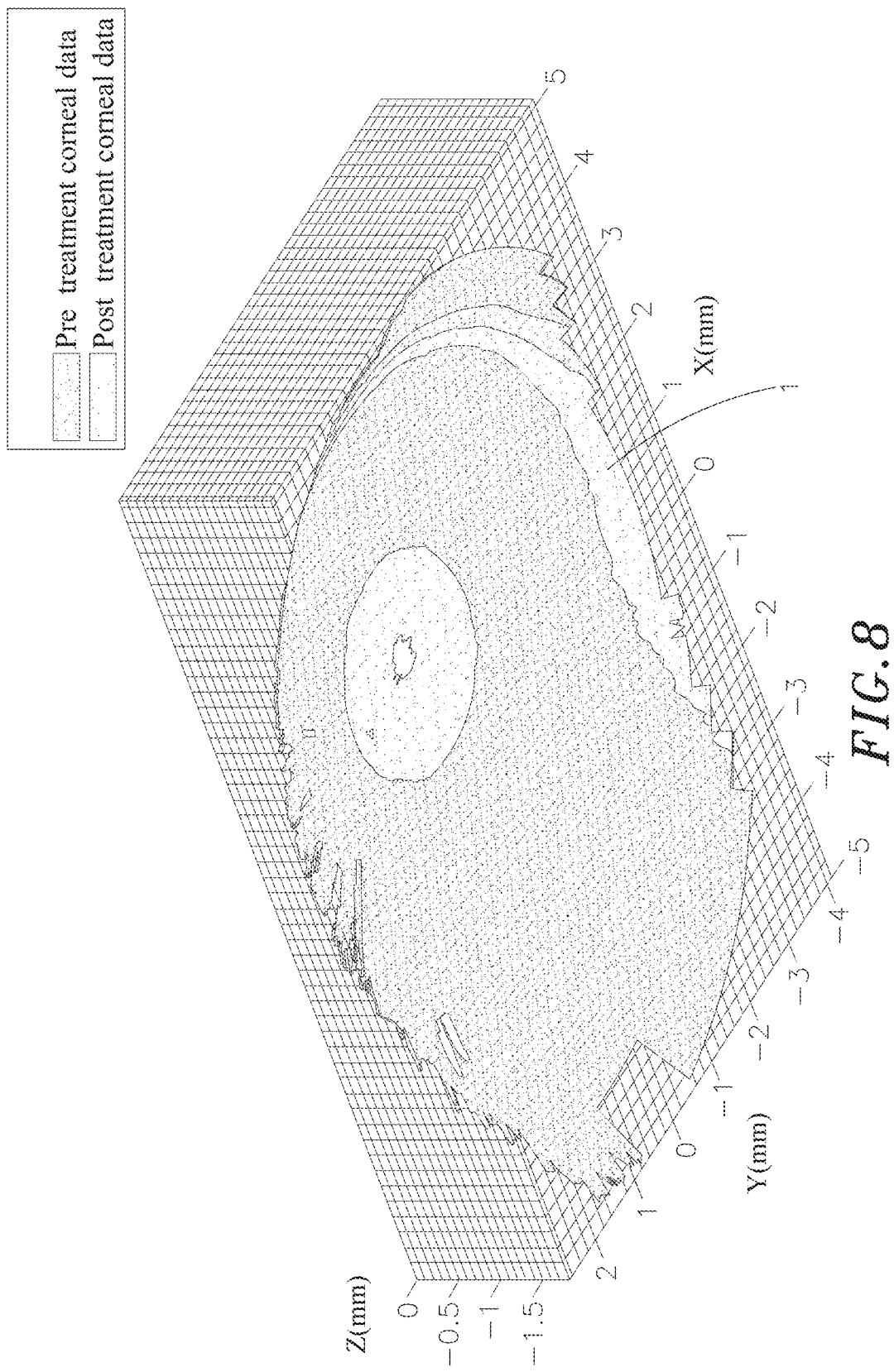
FIG. 8 is the actual corneal topography of the present invention before and after corneal treatment and after superimposition.
Figure 9:
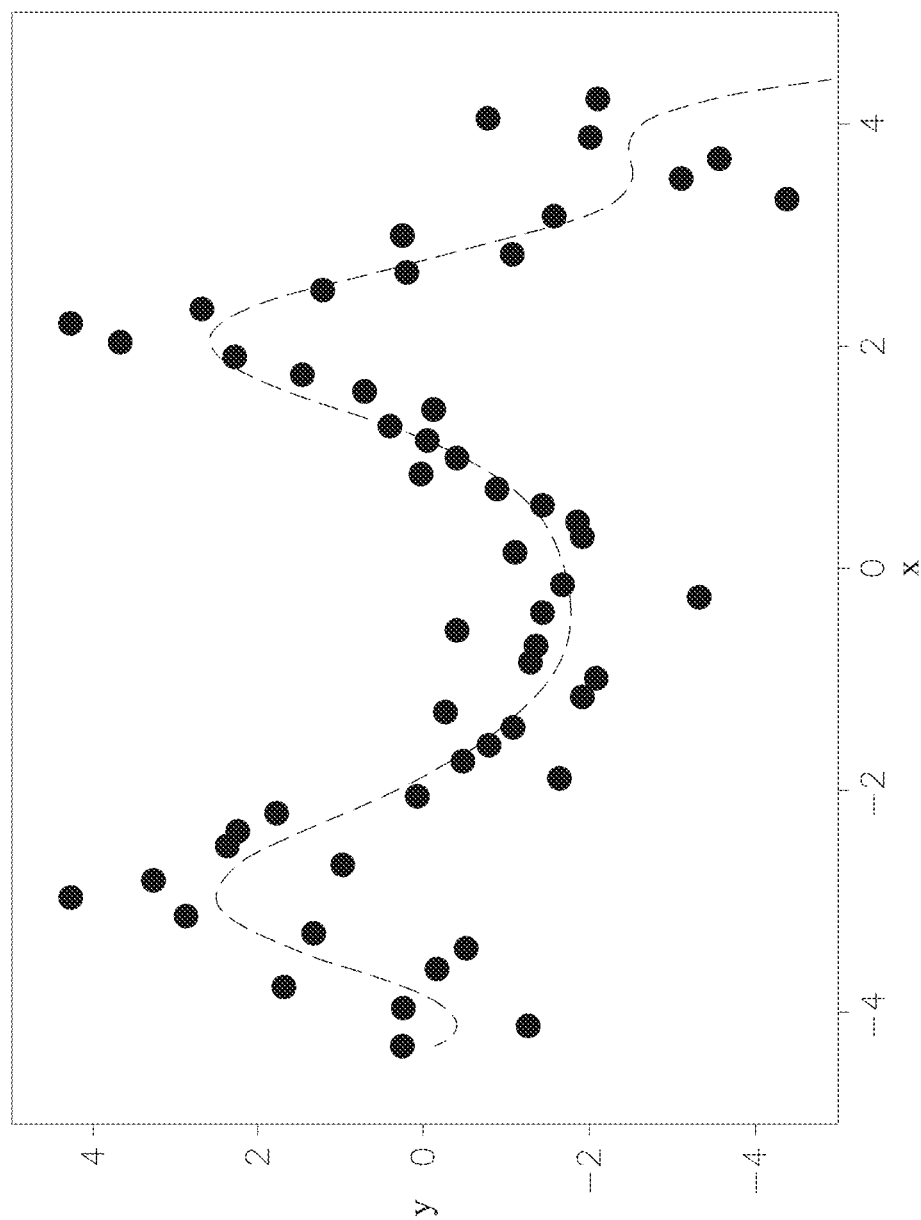
FIG. 9 is the power profile (I) analyzed before and after corneal treatment of the present invention.

Referring to FIGS. 1-10, as shown in the drawings, it can be clearly seen that the myopia management soft contact lens design derive from analysis of overnight orthokeratology procedure of the present invention is carried out according to the following steps:

(A01) According to the reference position of the cornea 1 before and after treatment in the 3D visual center, mathematical calculations are used to obtain the corneal height data of the cornea 1 before corneal treatment 11 (see FIG. 4, the topographic map before corneal treatment) and after corneal treatment 12 (see FIG. 4, the topographic map after corneal treatment), then perform the corneal change difference calculation 13 based on the corneal height data and the reference position of the cornea 1 (see FIG. 4, the topographic map of the corneal change difference).

(A02) According to the corneal height data and the tangential curvature data, the difference of the corneal height change between before corneal treatment 11 and after corneal treatment 12 is obtained, and the size of the central optical zone 2 and the size of the peripheral treatment zone 3 of the corresponding effect are obtained.

(A03) Through the position of the central optical zone 2, the position of the peripheral treatment zone 3 and the axial curvature data, the corresponding power change is calculated using an algorithm.

(A04) The average power curve of the cornea 1 before corneal treatment 11 and after corneal treatment 12 is calculated by the algorithm.

(A05) Divide the data of the cornea 1 before and after treatment to distinguish the different myopia power correction ranges to analyze the corresponding different power profiles, and then this power profile is applied to the front curved surface of the lens for manufacturing soft contact lenses.

(A06) Complete the design of contact lenses.

Figure 2:
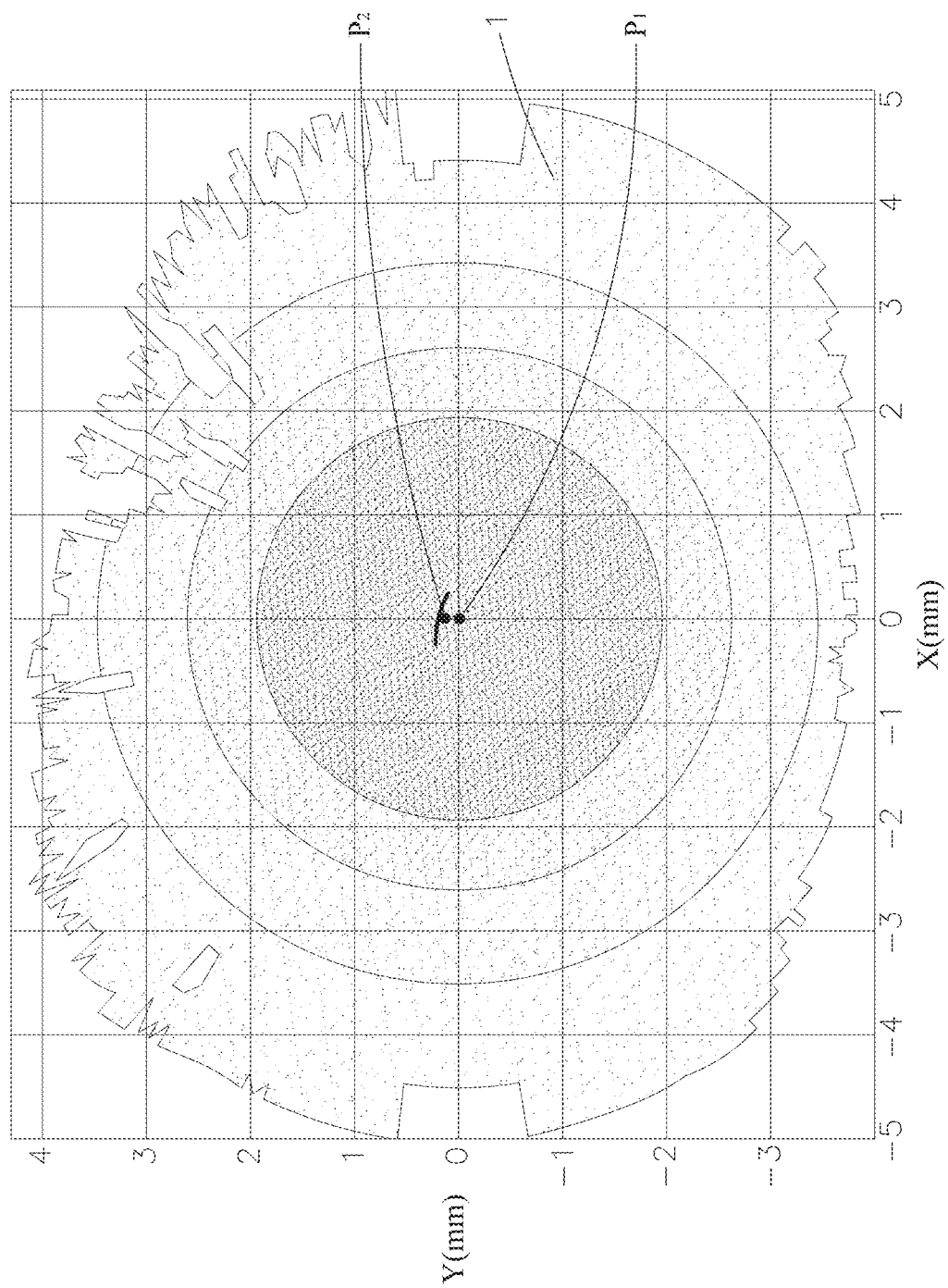
FIG. 2 is a plan view of the center of the visual axis of the invention.
Figure 3:
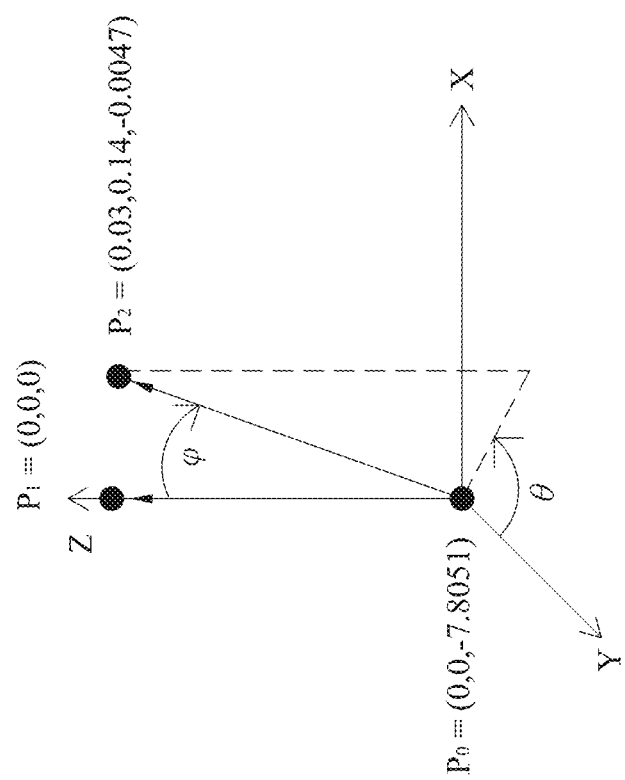
FIG. 3 is the coordinate map of the center of the visual axis of the invention.

As mentioned in the above step (A01), the reference position of the cornea 1 before and after treatment (please refer to the highest point position $P_1$ of the cornea 1 on the reference axis and the highest point of measurement $P_2$ as shown in FIG. 2), use mathematical calculation method to obtain the corneal height data before and after treatment of the cornea 1. The mathematical calculation method is a mathematical calculation method such as 3D rotation matrix algorithm or Iterative Closest Point algorithm, which can superimpose the corneal height data before and after treatment of the cornea 1 according to the reference position. The 3D rotation matrix algorithm is $$R_x = \begin{bmatrix} 0 & 0 & 0 \\ 0 & \cos\alpha & -\sin\alpha \\ 0 & \sin\alpha & \cos\alpha \end{bmatrix}, R_y = \begin{bmatrix} \cos\beta & 0 & \sin\beta \\ 0 & 1 & 0 \\ -\sin\beta & 0 & \cos\beta \end{bmatrix}, R_z = \begin{bmatrix} \cos\gamma & -\sin\gamma & 0 \\ \sin\gamma & \cos\gamma & 0 \\ 0 & 0 & 1 \end{bmatrix},$$

$$\alpha = -\frac{\pi}{2} + \cos^{-1}[(N_x, N_y, N_z) \cdot (0, 1, 0)]^\circ,$$

$$\beta = -\frac{\pi}{2} + \cos^{-1}[(N_x, N_y, N_z) \cdot (0, 0, 1)]^\circ \text{ and } \gamma = 0^\circ.$$

Use Zernike fitting to find the optical region vector, and calculate the angle [φ] difference between the highest point position $P_1$ of the cornea 1 on the reference axis and the highest point of measurement $P_2$ in the 3D space (please also refer to FIG. 2). As for the Iterative Closest Point algorithm system is (TR*MP+TT)=D, where the TR is the rotation matrix that minimizes the distance; TT is translation vector; MP is move plane for overlap (after treatment data); and D (Datum is Baseline equal to before treatment data).

And as described in the above step (A02), between the Corneal height data and Tangential curvature data, the corneal height data is converted into tangential curvature data, which is performed according to the following formula:

$$K(\text{Tangential curvature}) = \frac{|D_2|}{\sqrt{[1+(D_1)^2]^3}},$$

$$D_0 = \frac{Z_1 - Z_0}{R_1 - R_0}, D_1 = \frac{Z_2 - Z_1}{R_2 - R_1}, D_2 = \frac{D_1 - D_0}{R_2 - R_1},$$

where the $Z_0$: the height of the starting point; the $Z_1$: the height of the cornea 1 at the first point; the $Z_2$: the height of the cornea 1 at the second point; the $R_0$: the radius of the starting point; the $R_1$: the radius of the first point; the $R_2$: the radius of the second point. The difference in the corneal height change of the cornea 1 before and after treatment is that the height data of the cornea 1 after the treatment is used to obtain the position of the corresponding complex point (x) formed in the central optical zone 2 and the position of the complex point (y) formed in the peripheral treatment zone 3 within 360 degrees (see also FIG. 5), and use the Curve fit calculation method to obtain a better range of the central optical zone 2 and the peripheral treatment zone 3, and the Curve fit method uses Least-square analysis:

error=$\Sigma[(x-x_c)^2+(y-y_c)^2-R^2]$, the error=0,

Substitute the complex point (x) of the central optical zone 2 and the complex point (y) of the peripheral treatment zone 3 into the above formula of the Least-square analysis to solve for the $X_C$, $Y_C$, and R value, where ($X_C$, $Y_C$) is the position of the center point of the fitting circle, and the R is the radius value of the fitting circle; in addition, the central optical zone 2 is the corrected vision area, and the peripheral treatment zone 3 is the myopia control area.

As described in the above step (A03), the algorithm to calculate the power change data of the cornea 1 before and after treatment is the area analyzed by applying the distribution change of Axial curvature data and combining with Tangential curvature data after superimposing to depict the corresponding Power profile (please also refer to FIG. 10), in which, the curves C1~C5 are the central optical zone and peripheral treatment zone power profile corresponding to different myopia power obtained according to the statistical analysis results after analyzing the big data.

Figure 10:
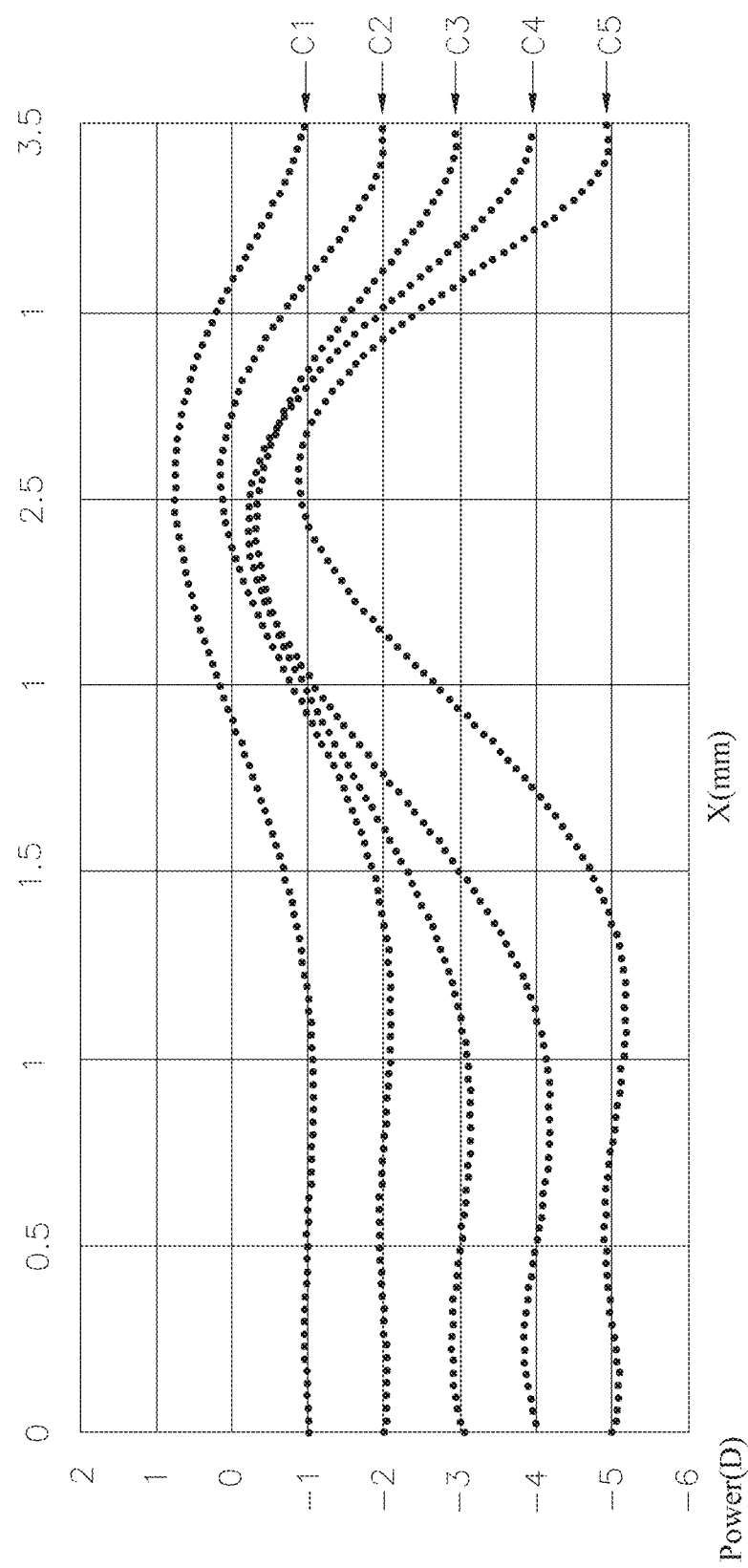
FIG. 10 is the power profile (II) analyzed before and after corneal treatment of the present invention.

As for the above step (A04), it is to obtain the difference in the corneal height change of the cornea 1 before and after treatment, and then calculate the power distribution and the power difference of the central optical zone 2 refractive power and the peripheral treatment zone 3 refractive power of the contact lens through the axial curvature data, and then combine the data with tangential curvature data to depict the corresponding power profile (please also refer to FIG. 10). According to this, the design of the contact lens can be completed, and subsequent processing can be provided to make the soft contact lens design structure for the myopia management soft contact lens design derive from analysis of overnight orthokeratology procedure of the present invention.

In the above steps, before the cornea 1 treatment is before wearing the treatment lens, the corneal height data of the cornea 1 before treatment of the cornea 1 is detected through the instrument; after the cornea 1 treatment is after wearing treatment lens, the corneal height data of the cornea 1 after cornea 1 treatment is detected by the instrument.

What the invention claimed is:

1. A method for forming a myopia management soft contact lens design derived from analysis of an overnight orthokeratology procedure, comprising the steps of:
   (A01) obtaining a corneal height data before and after corneal treatment according to a reference position of a cornea before and after corneal treatment by mathematical calculation, and then superimposing the corneal height data and the reference position of the cornea;
   (A02) obtaining a size of a central optical zone and a size of a peripheral treatment zone of a corresponding effect by obtaining a difference of a corneal height change between before and after corneal treatment according to the corneal height data and tangential curvature data;
   (A03) using an algorithm to calculate a corresponding power change through a position of the central optical zone, a position of the peripheral treatment zone and axial curvature data;
   (A04) using an algorithm to calculate an average power curve of the cornea before and after corneal treatment;
   (A05) dividing data of the cornea before and after treatment to distinguish different myopia power correction ranges to analyze corresponding different power profiles, and then applying the power profile to a front curved surface of a lens for manufacturing soft contact lenses; and
   (A06) completing the design of contact lenses,
   wherein in the above step (A02), the difference in the corneal height change before and after corneal treatment is that the height data of the cornea after the treatment is used to obtain the position of the corresponding complex point (x) formed in the central optical zone and the position of the complex point (y) formed in the peripheral treatment zone within 360 degrees, and use the Curve fit calculation method to obtain a better range of the central optical zone and the peripheral treatment zone, and the Curve fit method uses Least-square analysis:
   error=$\Sigma[(x-x_c)^2+(y-y_c)^2-R^2]$, substitute the complex point (x) of the central optical zone and the complex point (y) of the peripheral treatment zone into the above formula of the Least-square analysis to solve for the XC, YC, and R value, where (XC, YC) is the position of the center point of the fitting circle, and the R is the radius value of the fitting circle.

2. The method for forming the myopia management soft contact lens design derived from analysis of the overnight orthokeratology procedure as claimed in claim 1, wherein the mathematical calculation method of step (A01) is 3D rotation matrix algorithm or Iterative Closest Point algorithm, and the corneal height data before and after corneal treatment are superimposed according to the reference position.

3. The method for forming the myopia management soft contact lens design derived from analysis of the overnight orthokeratology procedure as claimed in claim 2, wherein the 3D rotation matrix algorithm is $$R_x = \begin{bmatrix} 0 & 0 & 0 \\ 0 & \cos\alpha & -\sin\alpha \\ 0 & \sin\alpha & \cos\alpha \end{bmatrix}, R_y = \begin{bmatrix} \cos\beta & 0 & \sin\beta \\ 0 & 1 & 0 \\ -\sin\beta & 0 & \cos\beta \end{bmatrix}, R_z = \begin{bmatrix} \cos\gamma & -\sin\gamma & 0 \\ \sin\gamma & \cos\gamma & 0 \\ 0 & 0 & 1 \end{bmatrix},$$

$$\alpha = -\frac{\pi}{2} + \cos^{-1}[(N_x, N_y, N_z) \cdot (0, 1, 0)]°,$$

$$\beta = -\frac{\pi}{2} + \cos^{-1}[(N_x, N_y, N_z) \cdot (0, 0, 1)]° \text{ and } \gamma = 0°,$$

using Zernike fitting to find the optical region vector and calculate the angle difference between the highest point position on the reference axis and the highest point of measurement in the 3D space.

4. The method for forming the myopia management soft contact lens design derived from analysis of the overnight orthokeratology procedure as claimed in claim 2, wherein the Iterative Closest Point algorithm is (TR*MP+TT)=D, where the TR is the rotation matrix that minimizes the distance; TT is translation vector; MP is move plane for overlap (after treatment data); and D (Datum is Baseline equal to before treatment data).

5. The method for forming the myopia management soft contact lens design derived from analysis of the overnight orthokeratology procedure as claimed in claim 1, wherein in the above step (A02), between the Corneal height data and Tangential curvature data, the corneal height data is converted into tangential curvature data, which is performed according to the following formula:

$$K(\text{Tangential curvature}) = \frac{|D_2|}{\sqrt{[1+(D_1)^2]^3}},$$

$$D_0 = \frac{Z_1 - Z_0}{R_1 - R_0}, D_1 = \frac{Z_2 - Z_1}{R_2 - R_1} \text{ and } D_2 = \frac{D_1 - D_0}{R_2 - R_1}$$

where the $Z_0$: the height of the starting point; the $Z_1$: the height of the cornea at the first point; the $Z_2$: the height of the cornea at the second point; the $R_0$: the radius of the starting point; the $R_1$: the radius of the first point; the $R_2$: the radius of the second point.

6. The method for forming the myopia management soft contact lens design derived from analysis of the overnight orthokeratology procedure as claimed in claim 1, wherein in the above step (A02), the central optical zone is the corrected vision area, and the peripheral treatment zone is the myopia control area.

7. The method for forming the myopia management soft contact lens design derived from analysis of the overnight orthokeratology procedure as claimed in claim 1, wherein in the above step (A03), the algorithm uses the central optical zone and the peripheral treatment zone to calculate the power distribution and the power difference between the refractive power of the central optical zone and the peripheral treatment zone using Axial curvature data.

8. The method for forming the myopia management soft contact lens design derived from analysis of the overnight orthokeratology procedure as claimed in claim 1, wherein in the above step (A04), the algorithm is the area analyzed by applying the distribution change of Axial curvature data and combining with Tangential curvature data after superimposing, and then depicting the corresponding Power profile.

* * * * *